(12) United States Patent
Mottier

(10) Patent No.: US 7,031,415 B2
(45) Date of Patent: Apr. 18, 2006

(54) BI-MODULAR ADAPTIVE CDMA RECEIVER

(75) Inventor: David Mottier, Rennes (FR)

(73) Assignee: MItsubish Denki Kabushiki Kaisha, Tokyo (JP)

( * ) Notice: Subject to any disclaimer, the term of this patent is extended or adjusted under 35 U.S.C. 154(b) by 799 days.

(21) Appl. No.: 09/933,737

(22) Filed: Aug. 22, 2001

(65) Prior Publication Data

US 2002/0080859 A1 Jun. 27, 2002

(30) Foreign Application Priority Data

Sep. 7, 2000 (FR) .................................. 00 11682

(51) Int. Cl.
*H04B 1/10* (2006.01)
(52) U.S. Cl. ...................... 375/349; 375/347; 375/148
(58) Field of Classification Search ................ 375/148, 375/144, 346–350, 232–233, 235; 455/500–506, 455/101, 273, 303, 306–307, 137; 342/283
See application file for complete search history.

(56) References Cited

U.S. PATENT DOCUMENTS

| | | | | |
|---|---|---|---|---|
| 4,720,712 | A * | 1/1988 | Brookner et al. | 342/383 |
| 5,872,540 | A * | 2/1999 | Casabona et al. | 342/362 |
| 6,243,415 | B1 * | 6/2001 | Pipon et al. | 375/232 |
| 6,404,803 | B1 * | 6/2002 | Wang et al. | 375/148 |
| 6,714,584 | B1 * | 3/2004 | Ishii et al. | 375/148 |
| 6,823,174 | B1 * | 11/2004 | Masenten et al. | 455/63.4 |
| 2001/0026197 | A1 * | 10/2001 | Tomisato et al. | 333/18 |
| 2002/0045462 | A1 * | 4/2002 | Mottier | 455/526 |
| 2002/0072336 | A1 * | 6/2002 | Mottier | 455/101 |

OTHER PUBLICATIONS

H. Matsuoka, et al., IEEE, pp. 171-176, XP 000894297, "Path Diversity Using an Adaptive Array with Directional Antennas for High Bit Rate Time Mobile Communication Systems". Nov. 8, 1998.
B. Haller, International Zurich Seminar on Broadband Communications, pp. 29-36, XP-002169927, "Algorithms and VLSI Architectures for RLS-Based Time Reference Beamforming in Mobile Communications", Feb. 17-19, 1998.

* cited by examiner

*Primary Examiner*—Phuong Phu
(74) *Attorney, Agent, or Firm*—Oblon, Spivak, McClelland, Maier & Neustadt, P.C.

(57) ABSTRACT

The invention concerns a method of receiving a signal transmitted by a transmitter (k) and arriving at an array of antennae (300) after having propagated along a plurality of paths (i), comprising a filtering stage ($310_k$) decomposing each antenna signal into separate signals ($x_{l,i,k}$) issuing from the different paths, a channel formation step ($320_k$) forming path signals ($y_{i,k}$) from the said separate signals by means of a first set of complex coefficients ($b_{l,i,k}$), a combination step ($340_k$) linearly combining the said path signals by means of a second set of complex coefficients ($c_{i,k}$) in order to supply a combined signal ($z_k$), the method being characterized in that a plurality of first error signals ($\epsilon'_{i,k}$) are formed ($331_k$) between a reference value ($q_k$) of the signal transmitted and the said path signals ($y_{i,k}$) and in that a second error signal ($\epsilon''_k$) is formed ($351_k$) between the said reference value and the said combined signal ($z_k$), the first and second sets of complex coefficients being adapted ($330_k$, $350_k$) so as to respectively minimize the root mean square values of the first signals and of the second error signal.

10 Claims, 3 Drawing Sheets

BI-MODULAR ADAPTIVE CDMA RECEIVER

FIELD OF THE INVENTION

The present invention concerns in general terms a reception method and device operating in code distribution multiple access (CDMA) mode. More precisely, when the propagation of the signal between the transmitter of a user and an array of reception antennae takes place on multiple paths, the present invention makes it possible to estimate the signal transmitted by the transmitter from the antenna signals.

DESCRIPTION OF THE RELATED ART

In a fixed or mobile telecommunication system, the propagation of the signal from a transmitter to a receiver can take place by multiple paths, each path being characterised by a delay, a direction of arrival, an attenuation and a phase rotation. If the telecommunication system enables a plurality of transmitters to establish a link with the same receiver, as is the case in mobile cellular telecommunication systems, the signals from the different mobile terminals intended for the base station are transmitted by different channels. Each transmission channel comprises a plurality of paths as far as the base station, each path being characterised by a delay, a direction of arrival, an attenuation and a phase rotation.

Certain systems, such as the ones used in a direct sequence code distribution multiple access (DS-CDMA) technique must deal with high interference. The different users transmit at the same time in the same frequency band and the signals transmitted necessarily interfere with each other. The separation of the different users is effected by multiplying each symbol of the user by a spreading sequence peculiar to it, also for this reason referred to as the signature of the user, the different signatures ideally being chosen so as to be orthogonal. The spreading sequence frequency (chip rate) being greater than the frequency of the symbols, the signal transmitted by each user is distributed (or spread) in the frequency space. On reception, the signal of a user is separated by virtue of a filtering adapted to the corresponding signature. This filtering is also referred to as "despreading". The ratio between the band occupied by the spread signal and the band occupied by the information signal is referred to as the spread factor.

The signatures employed must have good correlation properties, namely a very pronounced auto-correlation peak and low inter-correlation values.

The first of these two characteristics allows synchronisation of the sequence received. It is very useful when the transmission channel of a user includes several propagation paths. This is because each path can then be isolated by virtue of a filtering adapted to the signature and to the delay of the path. Advantage can be taken of the diversity of propagation within the channel in order to increase the signal to noise ratio on reception. To do this, a bank of adapted filters is used, separating the different paths, and the outputs thereof are combined. The most widespread combination is MRC (Maximum Ratio Combining), which consists of multiplying the signal output from each adapted filter by the conjugate of the complex multiplicative coefficient introduced by the channel on the path concerned. The resulting filtering operation is a filtering adapted to the equivalent filter of the channel. Because of its structure, the receiver thus formed is referred to as a rake receiver. Naturally, perfect separation of the paths takes place only if the auto-correlation is a Dirac. In practice, however, the separation is not complete and leaves multipath interference, which is also referred to as self noise. FIG. 1 depicts schematically a DS-CDMA system with K users. The data of a user k are spread in frequency by the corresponding signature in the module $100_k$ before being transmitted over a channel $110_k$ having P paths. On reception, for a given user k, the signals being propagated according to the different paths i=1 . . . P of the channel are separated by adapted filters $120_{k,1}$ . . . $120_{k,P}$ (only the battery of filters of the user k has been depicted) before being weighted by a set of complex coefficients $c_{k,i}$. The signals thus weighted are added ($140_k$) and the resulting sum at the output of the rake receiver is subsequently detected in order to provide an estimation of the data of the user k. In the case of a downlink (links from a base station to a mobile terminal) the channels 1 to K are identical whilst they differ in the uplink (links from mobile terminals to the base station). The first case can, from this point of view, be considered to be a particular case of the second.

The second characteristic set out above guarantees a low level of interference between two distinct users. Nevertheless, there also, in practice, the inter-correlation between two signatures is rarely zero. This is notably the case in a so-called dazzle situation (Near-far effect) where a high-power signal received from a user interferes with the reception of a low-power signal coming from another user. Moreover, when the number of users is high, close to the spread factor, the sum of the interference of the different users, low if taken in isolation, can have very disturbing effects for detection.

More elaborate techniques of eliminating interference are then often necessary to mitigate the orthogonality defects of the sequences. To combat the interference between the channels of the different users (so-called multi-user interference), several methods have been proposed. A review of these will be found in the article by Simon Moshavi entitled "Multi-user detection for DS-CDMA communications" which appeared in IEEE Communications Magazine, October 1996, pages 124–136. Amongst the existing multi-user techniques, the techniques of subtractive elimination (Subtractive Interference Cancellation) have good performance for reasonable complexity in use. These techniques apply well to the simple situation where the transmission channel of a user includes a single path. In this case, the filter modelling the channel can be limited to the multiplication by a complex coefficient. When the channels are multipath, the situation is on the other hand much more complicated since it is necessary to eliminate both the multipath interference and the multi-user interference. An iterative detector with subtractive elimination of the multi-user interference when there are multiple paths was proposed in an article by M. C. Reed et al. entitled "Iterative Multiuser detection using antenna arrays and FEC on multipath channels" published in IEEE Journal on Selected Areas in Communications, Vol. 17, No 12, December 1999, pages 2082–2089. Each iteration of the detector comprises a filtering adapted to each propagation path of the transmission channel of the user, a channel formation and a combination of the rake type. These three steps can be considered to define the treatment of a rake receiver modified in that it includes a formation of channels according to the directions of arrival of the different paths.

Such a reception device is illustrated in FIG. 2. The device comprises an array of antennae ($200_1$) . . . ($200_L$). Each antenna ($200l$) is connected to a battery of adapted filters ($210_{i,k}$), i=1 . . . P, each filter ($210_i$) being adapted to a path i of the user k. The output signals relating to the same path i=1 . . . P are directed to channel formers ($220_{1,k}, \ldots, 220_{P,k}$). Each channel former ($220_{i,k}$) receives from a direction of arrival estimator ($230_{i,k}$) the estimated value $\hat{\theta}_{i,k}$ of the angle of arrival $\theta_{i,k}$ of the path i of the transmission channel k, which enables it to point its reception beam in the corresponding direction of arrival. In the case of an array of uniform linear antennae, the channel formation ($220_{i,k}$) consists of effecting the calculation:

$$y_{i,k} = \sum_{l=1}^{L} x_{l,i,k} \cdot \exp(-j\hat{\varphi}_{l,i,k}) \text{ where } \hat{\varphi}_{l,i,k} = 2\pi d/\lambda \cdot \cos\hat{\theta}_{i,k} \cdot (l-1) \quad (1)$$

and where $x_{l,i,k}$ and $y_{i,k}$ are respectively the inputs and output of the channel former ($220_{i,k}$).

$\hat{\theta}_{i,k}$ is the angle of arrival defined with respect to the axis of the linear antenna array, d is the distance between two antennae in the array and $\lambda$ the length of the wave transmitted.

The outputs of the P channel formers are multiplied at ($240_{i,k}$) by complex coefficients $\hat{c}_{i,k}$ before being added by an adder (250) in order to supply an output of the MRC (Maximum Ratio Combining) type. The complex coefficients $\hat{c}_{i,k}$ are the conjugates of estimations of the complex multiplicative coefficients of the different paths i of the user k, that is to say $\hat{c}_{i,k} = \hat{\alpha}_{i,k} \cdot \exp(-j\hat{v}_{i,k})$ where $\hat{\alpha}_{i,k}$ and $\hat{v}_{i,k}$ are respectively the estimated coefficient of attenuation and the estimated phase rotation of the path i of the user k. The result of the combination is therefore:

$$z_k = \sum_{i=1}^{P} y_{i,k} \cdot \hat{\alpha}_{i,k} \cdot \exp(-j\hat{v}_{i,k}) \quad (2)$$

This reception device makes it possible to effect both a channel formation in the directions of the different paths and a combination of the MRC type as in a rake filter.

The method proposed presupposes however that the coefficients of attenuation, the phase rotations and the directions of arrival of all the paths of all the users are determined.

BRIEF SUMMARY OF THE INVENTION

The aim of the invention is to propose a rake receiver including a channel formation but not necessitating the explicit calculation of the coefficients of attenuation, phase rotations and directions of arrival of the different paths.

This aim is achieved by the object of the invention, defined by a method of receiving a signal transmitted by a transmitter and arriving at an array of antennae after being propagated along a plurality of paths, comprising a filtering step decomposing each antenna signal into separate signals issuing from the different paths, a channel formation step forming the signals of paths from the said separated signals by means of a first set of complex coefficients, a combination step linearly combining the said signals of paths by means of a second set of complex coefficients in order to supply a combined signal, the method forming a plurality of first error signals between a reference value of the signal transmitted and the said signals of paths, and a second error signal is formed between the said reference value and the said combined signal, the first and second sets of complex coefficients being adapted so as to respectively minimise the root mean squares of the first signals and of the second error signal.

According to a first embodiment, the signal transmitted comprising modulated data in the form of symbols, the reference value is a pilot symbol.

According to a second embodiment, the signal transmitted comprising modulated data in the form of symbols, the method also includes a step of estimating the symbol transmitted from the combined signal, the said reference value then being an estimated value of the transmitted symbol.

According to a third embodiment, the signal transmitted comprising modulated data in the form of symbols, the method also includes a step of estimating the symbol transmitted from the combined signal, a step comprising a demodulation of the estimated symbol into estimated data, a deinterleaving and a channel decoding of the said data, a step comprising a channel recoding of the decoded data followed by an interleaving and a modulation of the said data in order to supply a re-estimated value of the transmitted symbol, the reference value then being chosen so as to be equal to the said re-estimated value.

Advantageously, the first and second sets of complex coefficients are adapted according to an algorithm of the LMS or RLS type.

The object of the invention is also defined by a device for receiving a signal transmitted by a transmitter, the device comprising an array of antennae and comprising means adapted to implementing the steps of the method disclosed above.

BRIEF DESCRIPTION OF THE DRAWINGS

The characteristics of the invention mentioned above, as well as others, will emerge more clearly from a reading of the description given in relation to the accompanying figures, amongst which.

DETAILED DESCRIPTION OF THE INVENTION

The basic idea of the invention is to dispense with an estimation of the directions of arrival, coefficients of attenuation and phase rotations of the different paths by initialising the complex coefficients of the channel formation and of the combination of paths at predetermined values and applying an algorithm for adapting these coefficients from the measurement of a signal of error between a reference signal and a signal observed after the recombination step.

Let the situation be assumed where a user k transmits symbols $s_k(t)$ over a transmission channel k consisting of a plurality of propagation paths i=1 . . . P. Each path i of the channel k arrives at an array of antennae at an angle of incidence $\theta_{i,k}(t)$. The array of antennae is preferably a linear array consisting of L antennae regularly spaced apart by a distance d, but other types of array, notably circular arrays, can also be envisaged.

Let $x_{l,i,k}$ be the signal received by the antenna l, l=(1, . . . , L) corresponding to the path of index i of the user of index k:

$$x_{l,i,k}(t) = [\alpha_{i,k}(t) \cdot \exp(jv_{i,k}(t))] \cdot [\exp(j2\pi d/\lambda \cos\theta_{i,k}(t) \cdot (l-1))] \cdot s_k(t) + n_{l,i,k}(t) \quad (3)$$

The first term between square brackets represents the attenuation and phase rotation undergone by the signal on the path i of the channel k, the second term between square brackets represents the phase shift due to the difference in operation between the antenna l and the reference antenna 1 and $n_{l,i,k}(t)$ represents the white additive Gaussian noise at the antenna l, including the thermal noise, the multipath interference and the multi-user interference. The signal transmitted $s_k(t)$ then undergoes a double phase rotation resulting from the channel effect ($v_{i,k}(t)$) on the one hand and the differences in operation between the antennae in the array on the other hand ($\phi_{l,i,k}(t)=2\pi d/\lambda \cos \theta_{i,k}(t).(l-1)$).

Figure 3:
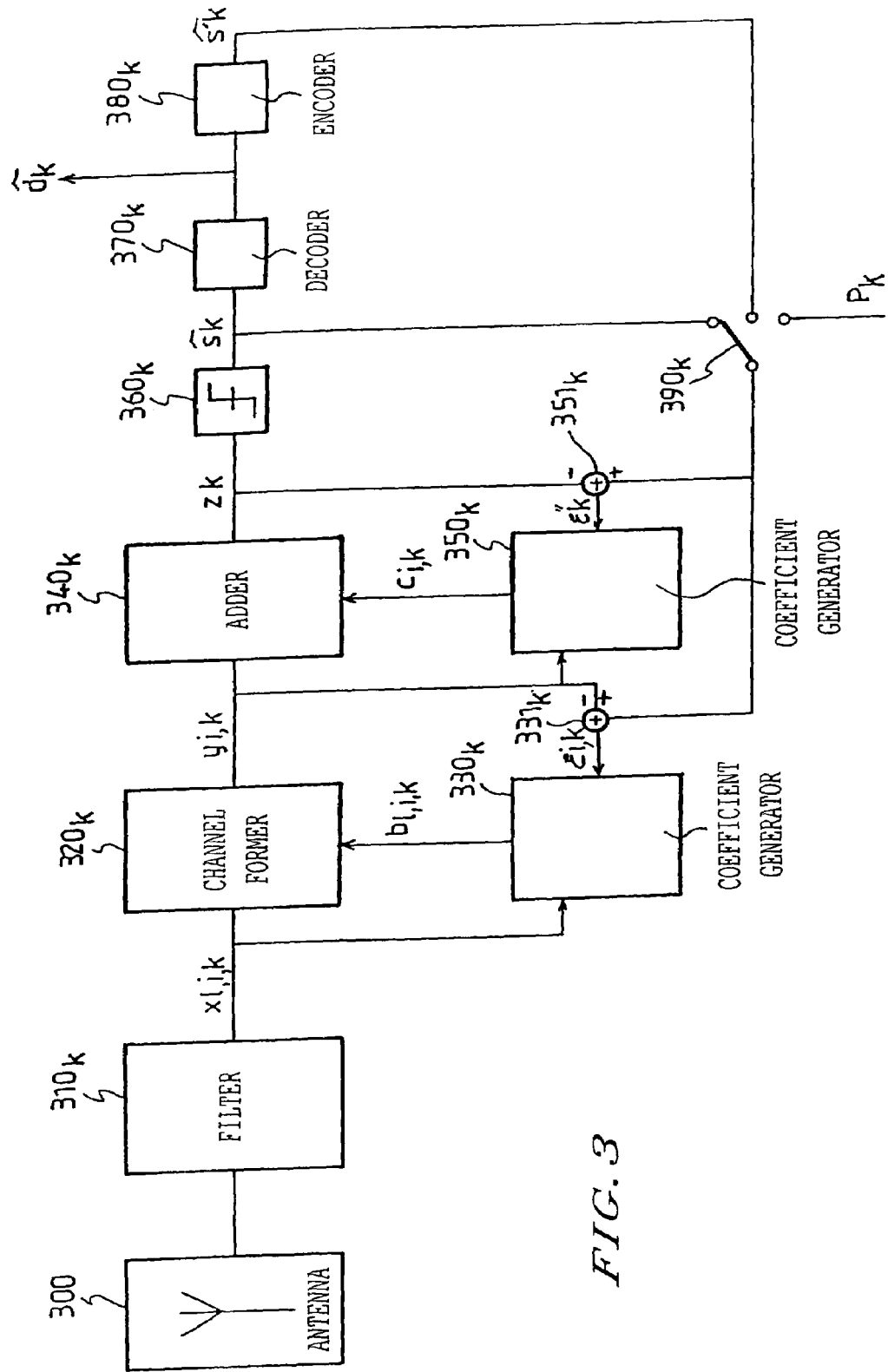
FIG. 3 depicts schematically a receiver according to one embodiment of the invention.

FIG. 3 illustrates a rake receiver including a channel formation with adaptation of the complex coefficients, as proposed by the invention.

The receiver depicted is dedicated to the reception of the symbols transmitted over a channel k. The system has L antennae represented schematically by the block ($300_k$). Each of the L antenna signals is then correlated by a battery of P adapted filters where P is the number of propagation paths of the channel, each filter being adapted to a path i. The set of L.P adapted filters is represented diagrammatically by the block ($310_k$), the L output signals, $x_{l,i,k}$, l=1 . . . L, of the filter adapted to the same path i being directed towards a channel former associated with this path. The P channel formers are depicted in the form of a single block ($320_k$). The P output signals, $y_{i,k}$, of these channel formers are then multiplied by weighting coefficients and added in the block ($340_k$) in order to supply a combination signal $z_k$. The combination signal is submitted to a decision unit ($360_k$) supplying, in soft or hard form, the symbol $\hat{s}_k$ transmitted by the user k. Soft form means here the result of a weighting of symbols by their respective a posteriori probabilities. The estimated symbol $\hat{s}_k$ is then demodulated in order to supply one or more estimated data $\hat{d}_k$. These data can then be subjected to an operation of deinterleaving and channel decoding ($370_k$) with soft or hard values (provided, naturally, that the data had been interleaved and coded by a channel coding corresponding to the level of the user). The channel former unit ($320_k$) performs the following operations:

$$y_{i,k} = \sum_{l=1}^{L} x_{l,i,k} \cdot b_{l,i,k} \quad (4)$$

where $b_{l,i,k}$ are complex weighting coefficients. Operation (4) can then be written in an equivalent manner in the following vector form:

$$y_{i,k}(t) = \bar{b}_{i,k}(t)^T \cdot \bar{x}_{i,k}(t) = (b_{1,i,k}(t) b_{2,i,k}(t) \ldots b_{L,i,k}(t)) \cdot \begin{pmatrix} x_{1,i,k}(t) \\ x_{2,i,k}(t) \\ \vdots \\ x_{L,i,k}(t) \end{pmatrix} \quad (4')$$

where $b_{l,i,k}(t)=\alpha_{l,i,k}.\exp(-j\psi_{l,i,k})$ with l=(1, . . . , L)

Secondly, the different paths of the signal of the user of index k are combined by the module ($340_k$). The combination signal $z_k$ is written:

$$z_k(t) = \bar{c}_k(t)^T \cdot \bar{y}_k(t) = (c_{1,k}(t) c_{2,k}(t) \ldots c_{P,k}(t)) \cdot \begin{pmatrix} y_{1,k}(t) \\ y_{2,k}(t) \\ \vdots \\ y_{P,k}(t) \end{pmatrix} \quad (5)$$

where $c_{i,k}(t)=\rho_{i,k}.\exp(-\zeta_{i,k})$ with i=(1, . . . , P)

The invention proposes to adapt the coefficients $b_{l,i,k}$ so as to minimise, in root mean square value, the first error signals output from the channel formation module (320) and to adapt the coefficients $c_{i,k}$ so as to minimise, in root mean square value, a second error signal output from the path combination module (340).

The first error signals are expressed by:

$$\epsilon'_{i,k}(t)=q'_{i,k}(t)-y_{i,k}(t) \quad (6)$$

The second error signal is expressed by:

$$\epsilon''_k(t)=q''_k(t)-z_k(t) \quad (7)$$

where $q'_{i,k}(t)$ and $q''_k(t)$ are reference values output from (320) and (340) respectively. The reference values $q'_{i,k}(t)$ and $q''_k(t)$ are chosen so as to be equal:

$q'_{i,k}(t)=q''_k(t)=q_k(t)$ where $q_k(t)$ is a common reference value which does not depend on the path.

To adapt the coefficients $b_{l,i,k}$ and $c_{i,k}$, it is possible to use, as the common reference value, as indicated symbolically by the switch ($390_k$), either directly pilot symbols $p_k(t)$ or estimated symbols $\hat{s}_k(t)$ output from the decision module ($360_k$), or the symbols $\hat{s}'_k(t)$ obtained after channel decoding and recoding. In the latter case, the estimated symbols $\hat{s}_k(t)$ are first of all demodulated and the data $\hat{d}_k$ obtained are deinterleaved, decoded by channel decoding ($370_k$) and then the data thus obtained are recoded by channel coding, reinterleaved and remodulated ($380_k$) in order to supply new estimated symbols, $\hat{s}'_k(t)$, having a better reliability than the initially estimated symbols $\hat{s}_k(t)$. Advantageously, the decisions on the symbols taken at ($360_k$) and those on the data taken at ($370_k$) have soft values, the symbols $\hat{s}'_k(t)$ then being obtained by the weighting of symbols in the constellation by their respective a posteriori probabilities. It should be noted that recoding is not necessary if the encoded data are recovered directly at the output from the decoding. For example, if an algorithm of the SOVA (Soft Output Viterbi Algorithm) type is used for decoding, the data in coded form can be recovered directly along the maximum likelihood path.

The adaptations of the coefficients $b_{l,i,k}$ and $c_{i,k}$ can be effected with the pilot symbols only or be pursued with the estimated symbols, before or after channel decoding, or be effected solely by virtue of the latter in the case of complete absence of pilot symbols.

The coefficients $b_{l,i,k}$ and $c_{i,k}$ are initialised at the start of the process of adaptation to the following values $b_{l,i,k}(0)=\delta(l-l_0)$ and $c_{i,k}(0)=c$ for each path i where $\delta$ is the Dirac symbol, $l_0$ is an antenna number and c a complex coefficient (for example equal to 1). The starting configuration is thus an omni-directional configuration (without channel formation) and multipath.

Alternatively, the coefficients $b_{l,i,k}$ can be initialised by means of an estimator external to the device according to the invention, supplying estimated values $\hat{\theta}_{i,k}(0)$ of the angles of arrival and estimated values $\hat{v}_{i,k}(0)$ of the phase rotations of the different paths at time 0. More precisely, the initial values $b_{l,i,k}(0)$ are chosen such that: $b_{l,i,k}(0)=\exp(-j(\hat{v}_{i,k}(0)+2\pi d/\lambda \cdot \cos\hat{\theta}_{i,k}(0).(l-1)))$. The coefficients $c_{i,k}$ can also be initialised by means of an estimator external to the device according to the invention, supplying estimated values $\hat{\alpha}_{i,k}(0)$ of the attenuations undergone by the signal along paths of the transmission channel at time 0. Then $c_{i,k}(0)=\hat{\alpha}_{i,k}(0)$ is chosen.

Figure 1:
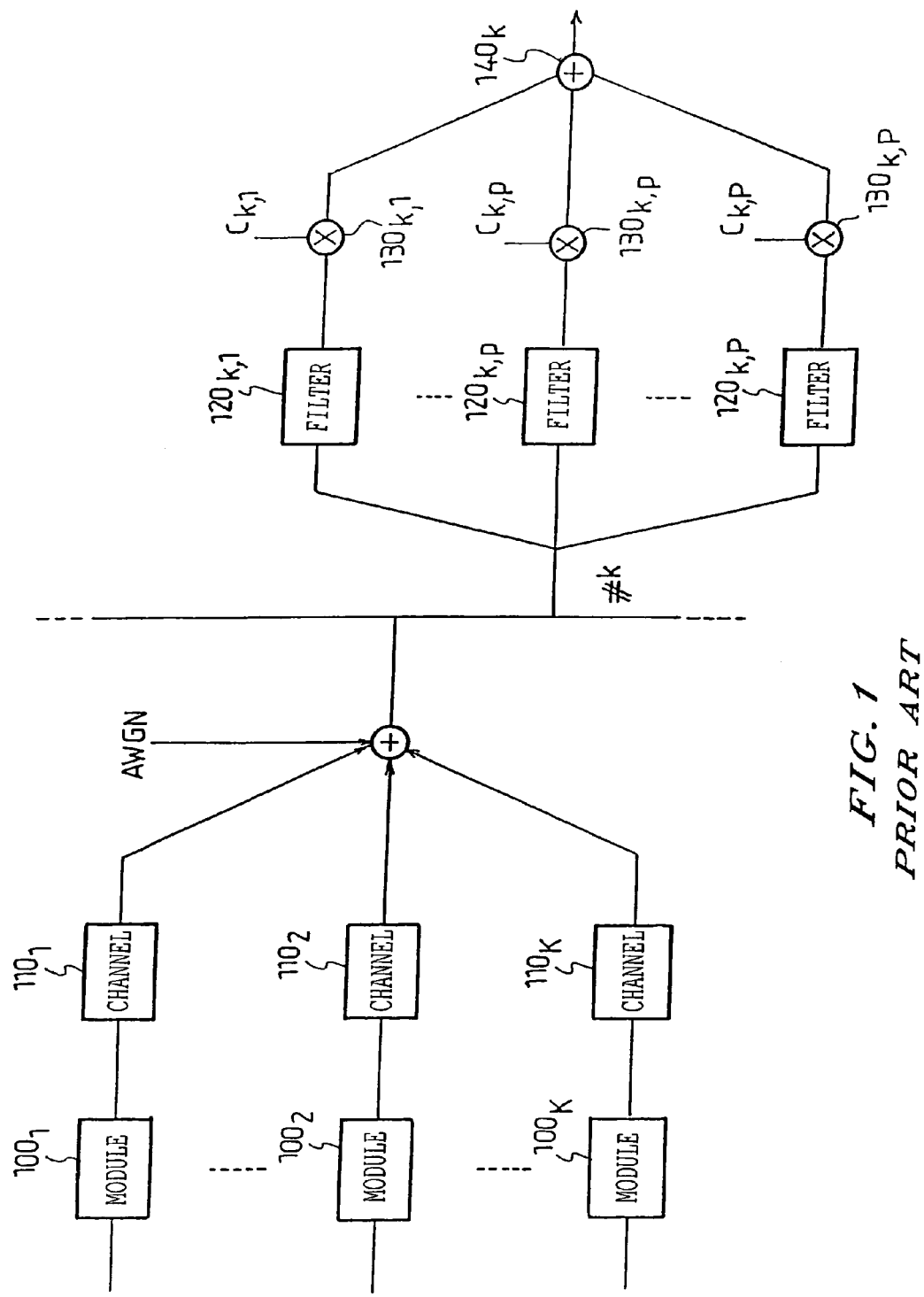
FIG. 1 depicts schematically a DS-CDMA telecommunication system.
Figure 2:
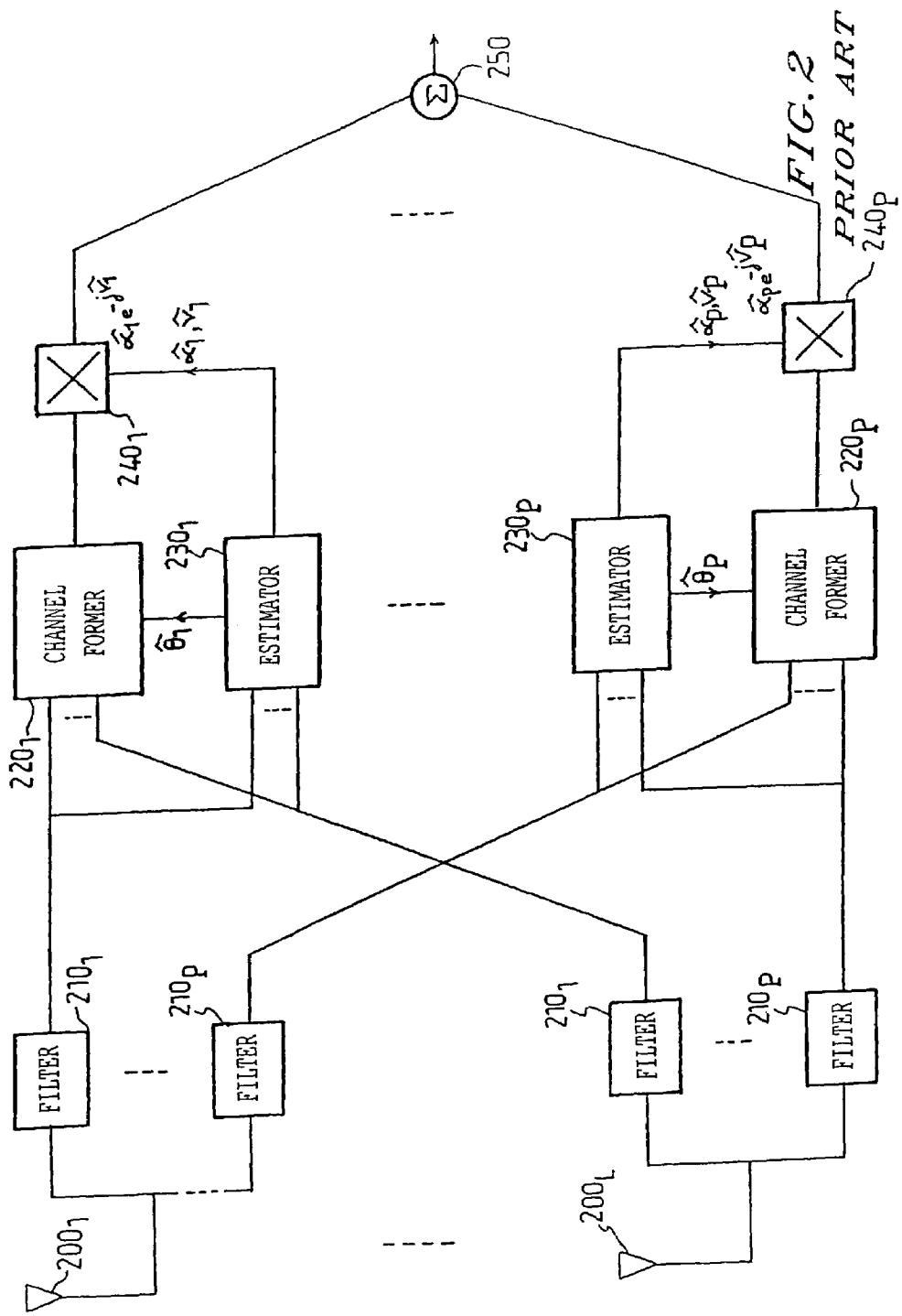
FIG. 2 depicts schematically a rake receiver including a channel formation.

Whatever the case, during the adaptation, the coefficients are modified so as to minimise the mean values $E(|\epsilon'_{i,k}|^2)$ and $E(|\epsilon_k''|^2)$. Because of the feedback of the error signal $\epsilon'_{i,k}$, the values $\psi_{l,i,k}$ converge progressively towards the values $v_{i,k}+\phi_{l,i,k}$ and consequently compensate for the phase differences due to the channel and to the difference in operation between antennae. As a result the channel formers are no longer content, as in the configuration illustrated in FIG. 2, to form beams in the directions of the different paths but also, at least partially, compensate for the phase rotations caused by the different paths. The module ($340_k$) then effects a combination on the signals of paths pre-compensated in phase issuing from the channel formers and corrects the phase difference remainders.

The coefficient adaptation algorithm is based on a minimisation of the root mean square error. Many algorithms have been proposed for this purpose in the literature and a description of the main ones can be found in the journal article by L. C. Godara entitled "Application of antenna arrays to mobile communications, Part II: Beam-forming and direction-of-arrival considerations" published in Proceedings of the IEEE, Vol. 85, No 8, August 1997, pages 1195–1245.

For example, it is possible to use an algorithm based on the stochastic gradient method.

More precisely, if $$J'_{i,k}(b_{i,k}) = E(\varepsilon'^2_{i,k}) = E\left(\left(q_k - \sum_l b_{l,i,k} \cdot x_{l,i,k}\right)^2\right)$$

and $$J''_k(c_k) = E(\varepsilon''^2_k) = E\left(\left(q_k - \sum_i c_{i,k} \cdot y_{i,k}\right)^2\right)$$

the coefficients are adapted as follows:

$$\overline{b}_{i,k}(t+1)=\overline{b}_{i,k}(t)-\mu'_{i,k}\nabla J'_{i,k}(t) \quad (8)$$

and $$\overline{c}_k(t+1)=\overline{c}_k(t)-\mu''_k\nabla J''_k(t) \quad (9)$$

where $\mu'_{i,k}$ and $\mu''_k$ are positive real coefficients defining the coefficient adaptation pitches.

If the so-called LMS (Least Mean Square) algorithm is used in its complex form, the gradients $\nabla J'_{i,k}$ and $\nabla J''_k$ are estimated at time t by $-\epsilon'_{i,k}(t).\overline{x}^*_{i,k}(t)$ and $-\epsilon''_k(t).\overline{y}^*_k(t)$ respectively, whence, taking account of (8) and (9):

$$\overline{b}_{i,k}(t+1)=\overline{b}_{i,k}(t)+\mu'_{i,k}\epsilon'_{i,k}(t).\overline{x}^*_{i,k}(t) \quad (8')$$

$$\overline{c}_k(t+1)=\overline{c}_k(t)+\mu''_k\epsilon''_k(t).\overline{y}^*_k(t) \quad (9')$$

where the symbol * designates the conjugation operator.

To ensure convergence of the adaptation, the coefficients $\mu'_{i,k}$ and $\mu''_k$ are chosen so as to be less than $1/\text{Tr}(R_{i,k})$ and $1/\text{Tr}(R_k)$ respectively, where $R_{i,k}$ and $R_k$ are the correlation matrices of the respective vectors $\overline{x}_{i,k}(t)$ and $\overline{y}_k(t)$ and Tr(M) is the trace of the matrix M.

Advantageously, coefficients $\mu'_{i,k}$ and $\mu''_k$ can be chosen with low values after the algorithm has begun to converge, in order to increase the degree of precision of the convergence. Equally, it is possible to choose coefficients $\mu'_{i,k}$ and $\mu''_k$ with larger values after the coefficient has commenced converging, in order to increase the ability to continue the algorithm. It is also possible to use a standardised LMS algorithm, in which the adaptation pitch ($\mu'_{i,k}$, $\mu''_k$) is divided by the norm of the input vector ($\overline{x}_{i,k}(t)$ and $\overline{y}_k(t)$ respectively) in equations (8') and (9').

As an alternative to the LMS algorithm, the adaptation can be effected by means of the RLS (Recursive Least Square) algorithm as described, for example, in the article cited above or by means of an algorithm derived from the latter, preferably the Fast-RLS algorithm as described in the article by D. Falconer et al. entitled "Application of Fast Kalman estimation of adaptive equalization" published in IEEE Transactions on Communications, Vol. COM-5, October 1978, pages 1439–1446.

The RLS algorithm is based on an inversion by recurrence of the correlation matrix ($R_{i,k}$, $R_k$). The complex coefficients $c_{i,k}$ are then adapted in the following manner:

$$\overline{c}_k(t+1)=\overline{c}_k(t)+\epsilon_{i,k}(t).\overline{k}^*_k(t) \quad (10)$$

where $$\overline{k}_k(t)=\overline{y}_k(t)^T.P_k(t) \quad (11)$$

where $\overline{k}_k$ is an updating vector referred to as the Kalman gain and $P_k(t)=R_k^{-1}(t)$ is the inverse of the correlation matrix calculated by the recurrence formulae:

$$P_k(t)=P_k(t-1)-P_k(t-1).\overline{y}_k(t)\overline{k}_k(t) \quad (12)$$

with $P_k(0)=I_p$ where $I_p$ is the unit matrix
and the Kalman gain $\overline{k}_k(t)$ is calculated by:

$$\overline{k}_k(t) = \frac{r_k(t)^T}{1+r_k(t)^T \cdot \overline{y}_k(t)} \quad (13)$$

where $r_k(t)$ is the linear form defined by $r_k(t)=P_k(t-1).\overline{y}_k(t)$ \quad (14)

The adaptation of $\overline{b}_{i,k}(t)$ is effected of course by equations similar to (10), (11), (12), (13), (14).

Advantageously, a forgetting factor will be included in equations (12) and (14) so that only the contributions of the most recent input vectors will be taken into account in the estimation of the correlation matrix.

According to one embodiment of the invention, the adaptation of $\overline{b}_{i,k}(t)$ will be effected by means of the standardised LMS algorithm and the adaptation of $\overline{c}_k(t)$ will be effected by means of the Fast-RLS algorithm.

Although the invention has been disclosed in the context of a DS-CDMA system, it can apply to other access modes provided that the channels of the different users and the different paths taken for a given channel can be separated on reception. Where the signals received are in broad band, it is important to provide an alignment timewise of the signals which underwent different propagation times. If the separation of the different users and paths is effected by means of batteries of filters at the antennae, the outputs of the filters relating to the same path must be delayed so as to be aligned timewise. Likewise, prior to the recombination, an alignment in time of the different paths must be provided for. The alignment in time may be effected by FIFO buffers with mobile output pointers adjusted finely by interpolation.

In addition, although the receiver of FIG. 3 has been depicted in the form of modules, it is however clear to a person skilled in the art that the operations represented by the different modules in FIG. 3 can be performed by a single processor programmed for this purpose or by a plurality of dedicated processors.

The invention claimed is:

1. Method of receiving a signal transmitted by a transmitter (k) and arriving at an array of antennae after having propagated along a plurality of paths (i), comprising a filtering stage decomposing each antenna signal into separate signals ($x_{l,i,k}$) issuing from the different paths, a channel formation step forming path signals ($y_{i,k}$) from the said separate signals by means of a first set of complex coefficients ($b_{l,i,k}$), a combination step linearly combining the said path signals by means of a second set of complex coefficients ($c_{i,k}$) in order to supply a combined signal ($z_k$), the method being characterised in that a plurality of first error signals ($\epsilon_{i,k}$) are formed between a reference value ($q_k$) of the signal transmitted and the said path signals ($y_{i,k}$) and in that a second error signal ($\epsilon''_k$) is formed between the said reference value and the said combined signal ($z_k$), the first and second sets of complex coefficients being adapted so as to respectively minimise the root mean square values of the first error signals and of the second error signal.

2. Reception method according to claim 1, characterised in that, the transmitted signal comprising modulated data in the form of symbols, the reference value is a pilot symbol ($p_k$).

3. Reception method according to claim 1, characterised in that, the transmitted signal comprising modulated data in the form of symbols, the method also includes a step of estimating the transmitted symbol from the combined signal ($z_k$), the said reference value then being an estimated value ($\hat{s}_k$) of the transmitted symbol.

4. Reception method according to claim 1, characterised in that, the transmitted signal comprising modulated data in the form of symbols, the method also includes a step of estimating the transmitted symbol from the combined signal ($z_k$), a step comprising a demodulation of the estimated symbol into estimated data, a deinterleaving and a channel decoding of the said data ($\hat{d}_k$), a step comprising a channel recoding of the decoded data followed by an interleaving and a modulation of the said data in order to supply a re-estimated value ($\hat{s}'_k$) of the transmitted symbol, the reference value then being chosen so 'as to be equal to the said re-estimated value.

5. Reception method according to one of the preceding claims, characterised in that the first set of complex coefficients is adapted according to an algorithm of the LMS or RLS type.

6. Reception method according to claim 5, characterised in that the second set of complex coefficients is adapted according to an algorithm of the LMS or RLS type.

7. Reception method according to claim 5, characterised in that the first set of coefficients is initialised with the values $b_{l,i,k}(0)=\delta(l-l_0)$, $\forall i$ and the second set of coefficients is initialised with the values $c_{i,k}(0)=c$, $\forall i$ where $\delta$ is the Dirac symbol, $l_0$ is an antenna number and c a given complex coefficient.

8. Reception method according to claim 5, characterised in that the first set of coefficients is initialised by means of a prior estimation of the directions of arrival of the said paths and the phase rotations undergone by the signal along the said paths.

9. Reception method according to claim 8, characterised in that the second set of coefficients is initialised by means of a prior estimation of the attenuations undergone by the signal along the said paths.

10. Device for receiving a signal transmitted by a transmitter (k), the device comprising an array of antennae (300), characterised in that it comprises mean adapted to the implementation of the steps of the method according to one of the preceding claims.

* * * * *

UNITED STATES PATENT AND TRADEMARK OFFICE
CERTIFICATE OF CORRECTION

| | |
|---|---|
| PATENT NO. | : 7,031,415 B2 |
| APPLICATION NO. | : 09/933737 |
| DATED | : April 18, 2006 |
| INVENTOR(S) | : Mottier |

It is certified that error appears in the above-identified patent and that said Letters Patent is hereby corrected as shown below:

<u>Title page,</u>
Item [73], should read :
-- Assignee:    Mitsubishi Denki Kabushiki Kaisha,
                Tokyo (JP) --.

Signed and Sealed this

Twentieth Day of June, 2006

JON W. DUDAS
*Director of the United States Patent and Trademark Office*